United States Patent
McCloskey

(10) Patent No.: US 9,769,979 B2
(45) Date of Patent: Sep. 26, 2017

(54) METHOD FOR PLANTING POTATOES AT HIGH SPEED AND EQUIPMENT FOR CARRYING OUT THAT METHOD

(71) Applicant: Robert Craig McCloskey, North Wiltshire (CA)

(72) Inventor: Robert Craig McCloskey, North Wiltshire (CA)

( * ) Notice: Subject to any disclaimer, the term of this patent is extended or adjusted under 35 U.S.C. 154(b) by 114 days.

(21) Appl. No.: 14/998,443

(22) Filed: Jan. 6, 2016

(65) Prior Publication Data

US 2017/0188508 A1    Jul. 6, 2017

Related U.S. Application Data

(62) Division of application No. 13/986,700, filed on May 28, 2013, now Pat. No. 9,258,940.

(51) Int. Cl.
| | |
|---|---|
| *A01C 9/00* | (2006.01) |
| *A01C 9/02* | (2006.01) |
| *A01C 9/08* | (2006.01) |
| *A01C 5/06* | (2006.01) |

(52) U.S. Cl.
CPC ............... *A01C 9/08* (2013.01); *A01C 5/062* (2013.01); *A01C 5/068* (2013.01); *A01C 9/00* (2013.01); *A01C 9/02* (2013.01)

(58) Field of Classification Search
CPC combination set(s) only.
See application file for complete search history.

(56) References Cited

U.S. PATENT DOCUMENTS

| | | | |
|---|---|---|---|
| 149,278 A | 3/1874 | Couteau | |
| 309,403 A | 12/1884 | Otstot | 111/194 |
| 800,620 A | 10/1905 | Bonner | |
| 912,827 A | 2/1909 | Deterding | |
| 1,073,702 A | 9/1913 | Owens | |
| 1,298,756 A | 4/1919 | Mendenhall | |
| 1,396,900 A | 11/1921 | Tworski | |
| 1,441,764 A | 1/1923 | Traphagen | |
| 1,466,585 A | 8/1923 | Hermance et al. | |
| 1,476,736 A | 12/1923 | Strandlund | |
| 1,547,784 A | 7/1925 | Brown | |
| 1,569,598 A | 1/1926 | Wesley | |
| 1,574,009 A | 2/1926 | Scogin | |
| 1,613,648 A | 1/1927 | Delaurler | |
| 1,640,625 A | 8/1927 | Strandlund | |

(Continued)

FOREIGN PATENT DOCUMENTS

| | | |
|---|---|---|
| CA | 2598431 | 8/2006 |
| DE | 385589 C | 12/1923 |
| GB | 337228 A | 10/1930 |

*Primary Examiner* — Alicia Torres
(74) *Attorney, Agent, or Firm* — Mario Theriault

(57) ABSTRACT

The method for planting potatoes at high speed includes the steps of providing a press wheel behind the seed release mechanism; opening a furrow in a soil; dropping potato seed pieces at spaced intervals in the furrow such that each seed piece or a portion thereof intersects a forward shadow of the press wheel, and catching and decelerating each seed piece against the soil in the furrow thereby reducing set roll in each seed piece. In an alternate embodiment a pair of spaced-apart press wheels are used. These alternate press wheels are mounted astride the furrow in a positive-camber alignment for moving the soil of the furrow against the seed piece.

14 Claims, 2 Drawing Sheets

(56) References Cited

U.S. PATENT DOCUMENTS

| | | | |
|---|---|---|---|
| 1,685,385 A | 9/1928 | White | 280/856 |
| 1,688,034 A | 10/1928 | Brown | |
| 1,696,864 A | 12/1928 | Robertson | 221/205 |
| 1,713,984 A | 5/1929 | Soltesz | 111/63 |
| 1,722,580 A | 7/1929 | Kaupke | |
| 1,824,233 A | 9/1931 | Rector | |
| 1,869,923 A | 8/1932 | Stevens | |
| 1,959,561 A | 5/1934 | Artrip | |
| 2,042,896 A | 6/1936 | Hofler et al. | |
| 2,053,390 A | 9/1936 | Bateman et el | |
| 2,091,432 A | 8/1937 | Cook | |
| 2,263,652 A | 11/1941 | Silver | |
| 2,318,561 A | 5/1943 | Silver | |
| 2,551,192 A | 5/1951 | Weber | |
| 2,562,070 A | 7/1951 | Strong | |
| 2,629,351 A | 2/1953 | Wenger | |
| 2,645,385 A | 7/1953 | Wechsler | |
| 2,667,286 A | 1/1954 | Raught | |
| 2,668,490 A | 2/1954 | Oehler et al. | 172/519 |
| 2,771,044 A | 11/1956 | Putifer | |
| 3,124,202 A | 3/1964 | Van Dyk | 172/551 |
| 3,507,233 A | 4/1970 | Greig et al. | 111/194 |
| 3,570,424 A | 3/1971 | Wigham | |
| 3,690,511 A | 9/1972 | Wigham | |
| 4,493,272 A | 1/1985 | Rouhotas, Sr. | |
| 4,579,071 A | 4/1986 | Johnson | |
| 4,714,033 A | 12/1987 | Neumeyer | |
| 4,995,325 A | 2/1991 | Herriau et al. | |
| 5,022,333 A | 6/1991 | McClure et al. | 111/194 |
| 5,595,130 A | 1/1997 | Baugher et al. | |
| 5,611,292 A | 3/1997 | Clark | |
| 5,724,903 A | 3/1998 | Yoder | |
| 6,244,201 B1 | 6/2001 | Mauch | |
| 2002/0043197 A1* | 4/2002 | Schaffert | A01C 5/062 111/120 |

\* cited by examiner

METHOD FOR PLANTING POTATOES AT HIGH SPEED AND EQUIPMENT FOR CARRYING OUT THAT METHOD

This is a divisional application of application Ser. No. 13/986,700, filed May 28, 2013.

FIELD OF THE INVENTION

This invention pertains to potato planting machines and more particularly it pertains to a method for planting potatoes.

BACKGROUND OF THE INVENTION

Potato planters from the prior art have not addressed the difficulties created by the momentum of the seed pieces when planting potatoes at high speed. For example, the following documents describe potato planters that are handling seed pieces one-by-one using a series of buckets mounted along a chain. The chain rotates at a same speed as the ground speed of the planter. As the chain rotates, the buckets drop seed pieces in a furrow at spaced intervals. These documents are:

U.S. Pat. No. 3,570,424 issued to J. H. Wigham on Mar. 16, 1971;
U.S. Pat. No. 3,690,511 issued to J. H. Wigham on Sep. 12, 1972;
U.S. Pat. No. 6,244,201 issued to W. Mauch et al., on Jun. 12, 2001.

Similarly, other types of agricultural planters are not addressing the momentum of seed pieces. The following documents describe seed planters having a press wheel mounted thereto for pressing the soil of the furrow against the seeds. The press wheels are mounted far behind the seed-drop chute and have no effect on the momentum of the seeds. These agricultural planters are described in the following documents:

U.S. Pat. No. 4,493,272 issued to L. M. Rouhotas, on Jan. 15, 1985;
U.S. Pat. No. 4,579,071 issued to D. J. Johnson on Apr. 1, 1986.

The documents found in the prior art comprise fixed-speed potato planters and agricultural planters that are designed to handle small seeds such as corn, wheat and other grains and soybeans, wherein the mass of these seeds is very low as compared to seed potatoes. Therefore, a search of the prior art has not given any suggestion for planting potatoes at higher speed than those used at the present time.

Different from cereals, corn, and bean crops, potatoes are not grown from seeds per se, which are relatively small in size and have little mass. Potatoes are grown commercially by farmers from cutting tubers or seed potatoes from the previous year's crop. When seed potatoes are cut into "seed pieces" or "sets" they can weigh from 1 oz., or less to 3-½ oz., or more. The seed run can also contain small round uncut seed potatoes mixed in with these larger irregular-shaped cut seed pieces.

"Seed potato"; "seed piece"; "set" and "potato seed piece" are used interchangeably in this document, to designate a whole tuber or a portion thereof that is used to germinate a potato plant.

Potato planters in general are used to separate and release seed pieces at a predetermine spacing in a row. Common spacings are 10, 12, 14, 18 and up to 24 inch. Most potato planters in the industry can achieve very good results at slow ground speeds. However, the seed spacing becomes inconsistent when these planters are pulled at ground speeds exceeding 2.5 to 2.8 mph. After the seed is released at high speed, it falls into the furrow and rolls until it loses all of its forward momentum. This is called "set roll". A certain amount of set roll would be acceptable if all the seed pieces had the same amount of set roll. That is not the case, however. In North America, growers usually cut their seed potatoes in parts which means that the seed pieces do not have an uniform shape, sizea and weight, and therefore, not the same ability to roll.

It is well known that when planting speeds exceed 2.5 mph, set roll begins to greatly affect the seed spacings. Despite of this, most potato growers don't go that slow during planting. Most growers want to take advantage of a sunny and dry period in mid-May usually, to plant their fields as early and as quickly as possible to maximize the number of growing days before harvest. Therefore, a majority of potato growers in Eastern Canada plant their fields at high speeds such as 4, 5 and even 6 mph when planting Russet-Burbanks™ or Gems™ varieties, for examples. These varieties are planted at 14 inches to 18 inches apart. Although the mechanisms of common planters work well at high speeds, these planters cannot release the right amount of seeds per acre, at the right spacing when planting speed exceeds 2.5 to 2.8 mph.

Seed piece spacing is critical to achieve an ideal yield per acre from a field. When the plants are too close to each other, the crop potatoes are small. When the plants are too far apart, the yield per acre is low and the crop potatoes may be larger than the ideal market size.

Therefore there is a need in the potato growing industry for a method of reducing set roll when planting seed pieces at higher speeds than the present limitations.

SUMMARY OF THE INVENTION

In the method for planting potatoes at high speed, according to the present invention, seed pieces are dropped in the forward shadow of a press wheel. The press wheel catches and decelerate each seed piece against the soft harrowed soil of the furrow for reducing set roll. More specifically, this method includes the steps of: opening a furrow in a soil; dropping seed pieces at spaced intervals in the furrow such that each seed piece or a portion thereof intersects a forward shadow of the press wheel, and rolling a soft portion of the press wheel over each seed piece for decelerating and reducing set roll in each seed piece.

In another aspect of the present invention, the method includes the step of tucking each seed piece in the furrow before closing the furrow over the seed piece.

In yet another aspect of the present invention, the press wheel has firm sides and a soft and flexible center. The firm sides prevent the wheels from sinking strongly into the furrow. The soft and flexible center of the press wheel softly catches each seed piece and lightly presses the seed piece against the soft harrowed soil of the furrow for decelerating the seed piece into the soft soil of the furrow. The soft center of the press wheel has flexibility to catches seed pieces of all sizes and shapes and to impart a consistent deceleration to all these seed pieces.

In a further aspect of the present invention, there is provided an arrangement of equipment for planting seed pieces at high speed. This equipment includes a potato planter having in series; a plow or a furrow-opening shoe, a seed drop chute and a pair of closing discs. More particularly, this equipment includes a press wheel mounted between the seed drop chute and the closing discs. In that arrangement, the seed drop chute has a deflector therein for deflecting seed pieces toward the forward shadow of the press wheel.

The words "plow"; "plough" or "plough-share" were used in the prior art to designate a pair of V-shaped plates that were mounted to a planter to open a furrow in the soil. Modern potato planters refer to that element as a "shoe", and therefore, the words "furrow-opening shoe" is used herein to designate this element, the function of which is to open a furrow in a harrowed soil.

Testing of the present method with a variety that was planted at 10 inches apart, has given consistent seed spacings, with very little set roll, at planting speeds of up to 4 mph. It is believed that better results can still be obtained after adjustment of the downward force on the press wheel and adjustment of the dimensions and relative position of the furrow-opening shoe.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

A preferred embodiment of the method according to the present invention is described with the aid of the accompanying drawings, in which like numerals denote like parts throughout the several views, and in which.

DESCRIPTION OF THE PREFERRED EMBODIMENT

Figure 1:
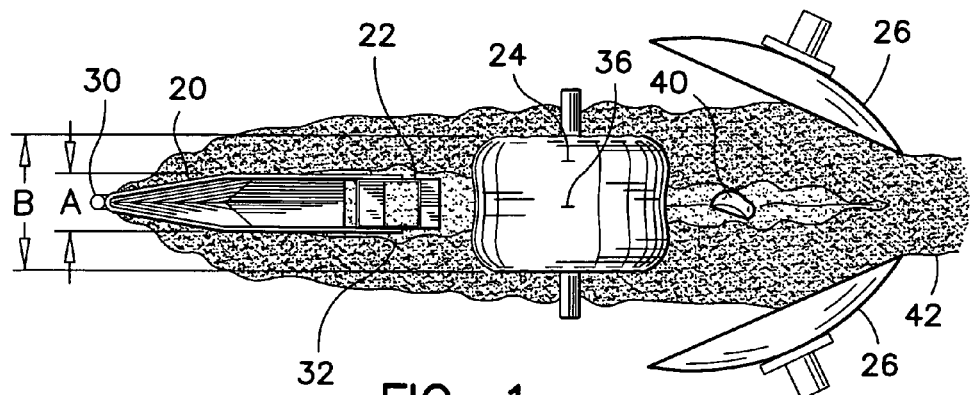
FIG. 1 is a plan view of the preferred equipment for planting potato seed pieces at high speed.
Figure 2:
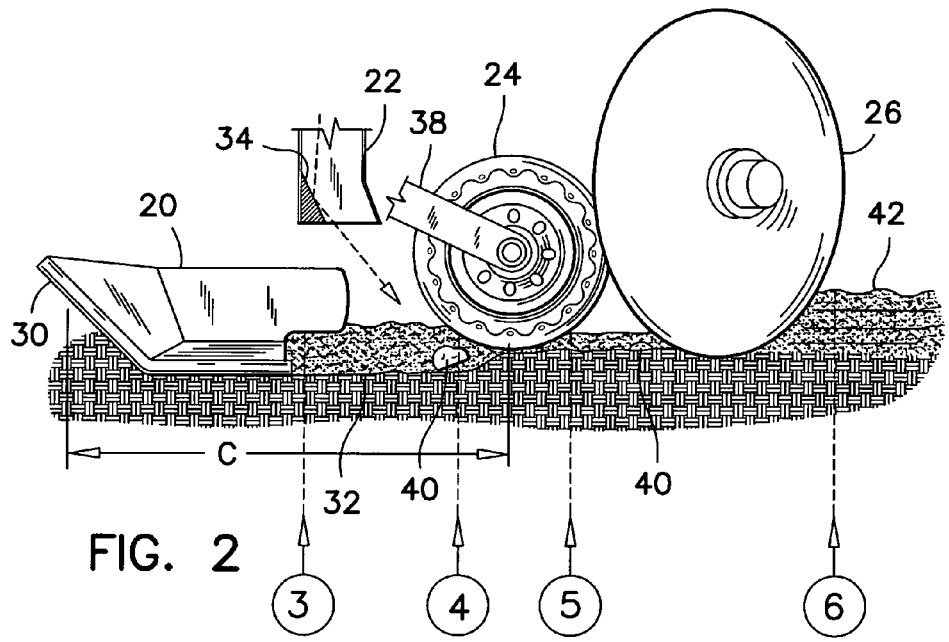
FIG. 2 is a side elevation view of the preferred equipment shown in FIG. 1.
Figure 3:
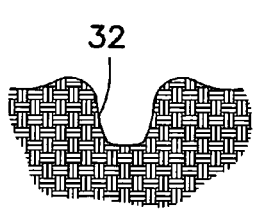
FIG. 3 is a cross section view of a planting groove or a furrow made by the preferred equipment at location 3 along the furrow as indicated in FIG. 2.

Referring to FIGS. 1 and 2, the preferred equipment required to carry out the method according to the present invention will be described. The preferred equipment comprises in series, a furrow-opening shoe 20, a seed drop chute 22, a press wheel 24 and a pair of closing discs 26. The preferred furrow-opening shoe 20 has a one-inch diameter cutting bar 30 thereunder for opening a furrow 32 in the soil. The preferred furrow-opening shoe 20 has a slender shape with a total width "A" of about 3 inches and an effective soil-contacting length of about 12 inches. These dimensions are not essential as a slightly more obtuse shoe shape has also given satisfactory results.

The preferred seed drop chute 22 has a deflector 34 mounted therein to cause the seed piece to be diverted toward the press wheel 24. The press wheel is mounted in such a way as to press down against both sides of a furrow 34. The press wheel 24 has a preferred diameter of about 10 inches and a preferred width "B" of about 7 inches. It is made of two relatively narrow hard-rubber casters covered by a flexible membrane 36 extending the full width thereof. The membrane 36 covers a void between the casters such has to form a soft region around the central circular portion of the press wheel 24. The soft circular region preferably extends over a width of about one third of the total width of the wheel. Each of the harder side circular regions covers a width of about one third of the total width of the wheel 24.

The press wheel 24 is supported on bearings (not shown) in a pair of arms 38 and can be forced against the soil by the movement of these arms 38. The preferred distance "C" between the center of the press wheel 24 and the effective tip of the furrow-opening shoe 20 is about 24 inches.

The structure and function of the closing discs 26 are well known in the art and therefore do not need any explanation.

Figure 4:
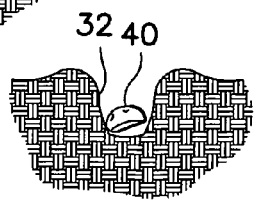
FIG. 4 is a cross section view of a planting groove or furrow made by the preferred equipment at location 4 along the furrow as indicated in FIG. 2.

Referring now to FIGS. 3, 4, 5, and 6, the operation of the preferred equipment will be explained. Firstly, the furrow-opening shoe 20 opens a furrow or groove 32 in the soil. That groove has a width of 2 to 3 inches and a dept which is about twice or slightly more than the size of an average seed piece. In FIG. 4, a seed piece 40 is planted in the furrow 32 immediately ahead of the press wheel 24, such as to be immediately pressed by the wheel 24 against the bottom of the furrow 32 to prevent set roll.

Figure 6:
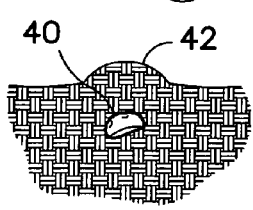
FIG. 6 is a cross section view of a planting groove or furrow made by the preferred equipment at location 6 along the furrow as indicated in FIG. 2.
Figure 5:
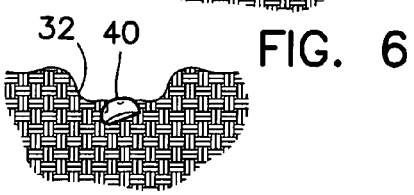
FIG. 5 is a cross section view of a planting groove or furrow made by the preferred equipment at location 5 along the furrow as indicated in FIG. 2.

In operation, each seed piece 40 is deflected to fall within the shadow of the press wheel 24. The seed piece 40 is captured against the soil by the soft region of the press wheel 24, while the harder sides of the press wheel 24 push the soil from the sides of the furrow into the furrow 32 closing the furrow against the seed piece 40 and partly covering the seed piece 40, as illustrated in FIG. 5. This action of the press wheel 24 against the seed piece is referred to as tucking the seed piece 40 into the furrow 32. Then, the closing discs 26 bring more soil over the seed piece 40, forming a row 42 of potato plants as shown in FIG. 6.

Figure 7:
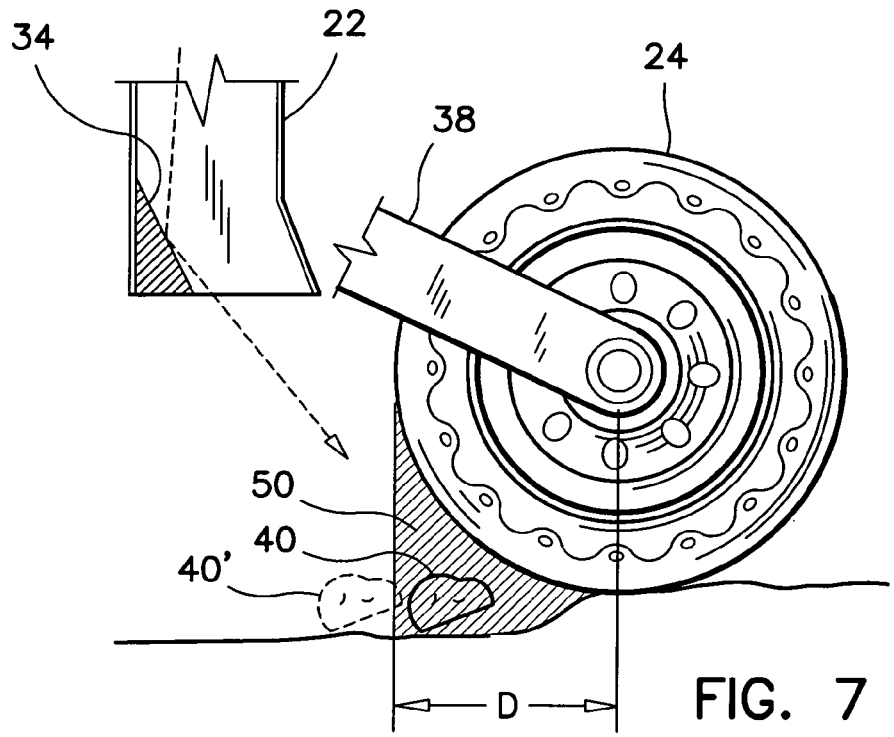
FIG. 7 is an enlarged view of the press wheel portion of FIG. 2.

Referring now to FIG. 7, the best placement of seed pieces relative to the press wheel 24 will be explained. A vertical projection "D" of the forward half of the press wheel 24 is illustrated by a shaded area 50 in FIG. 7. The region defined by the shaded area 50 is referred to as the forward shadow 50 of the press wheel 24. During planting seed pieces at high speed, it is preferable to deflect each seed piece 40 such that it will fall within the forward shadow 50 of the press wheel, but without hitting the press wheel 24. High speed planting is also possible with minimum set roll when the seed piece falls slightly ahead of the press wheel 24 with only a portion thereof intersecting the forward shadow 50 such as illustrated by seed position 40'.

Although a wide press wheel 24 with a soft middle portion has been described in the preferred equipment, it will be appreciated that good results can also be obtained using equivalents. Such equivalents include a belt on two rollers, a caterpillar track, a skid plate and a flexible trailing flap, or other devices from which a moving shadow 50 and its association with a catching action can be defined.

Figure 8:
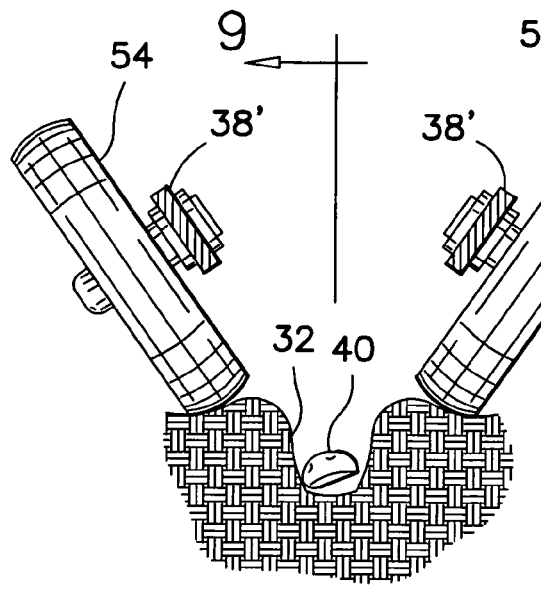
FIG. 8 shows a rear view of an alternate embodiment of the press wheel included in the preferred equipment.
Figure 9:
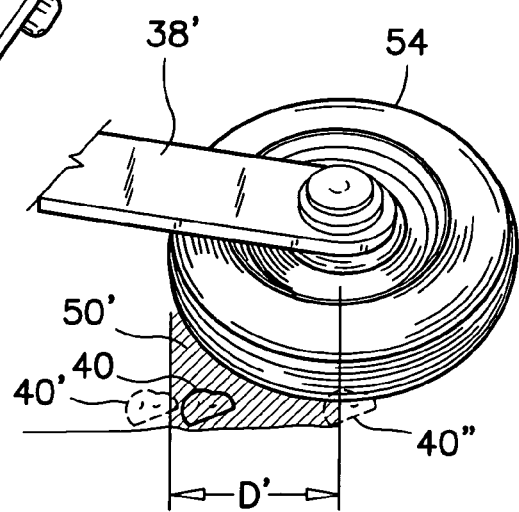
FIG. 9 is a cross-section view of one of the press wheels in the alternate embodiment, as seen along line 9 in FIG. 8.

Referring now to FIGS. 8 and 9, a rear elevation view and a cross-section view of an alternate embodiment of the press wheel 24 respectively, are illustrated. In this alternate embodiment, a pair of press wheels 54 are mounted in a spaced-apart relationship, astride the furrow 32. The plans of the press wheels 54 are tilted in a positive-camber-like alignment of about 25° to 35° from a vertical line, with their bottom regions being closer to each other. The press wheels 54 are mounted that way for pressing simultaneously on both sides of the furrow 32, for closing the furrow on the seed piece 40 and for more effectively tucking the seed piece 40 into the furrow for reducing set roll.

The press wheels 54 are preferably larger in diameter than the previously-mentioned press wheel 24, and the spacing there between reduces the possibility of a seed piece 40 hitting one of them. The preferred diameter of the press wheels 54 is about 14 to 18 inches. This arrangement increases the length D' of the forward shadow 50' in which a seed piece 40 can fall and be captured by the closing soil of the furrow, for preventing set roll. It will be appreciated that the method mentioned before in relation with the press wheel 24 also applies to the use of the pair of tilted press wheels 54. The pair of tilted and spaced-apart press wheels 54 eliminates the step of rolling over the seed pieces and improves the tucking step mentioned before. The step of dropping seed pieces at spaced intervals in a furrow such that each seed or a portion thereof intersects the forward shadow of a press wheel, still applies whether the wider press wheel 24 or the pair of narrower press wheels 54 are used.

The pair of press wheels 54 are mounted on movable arms 38' substantially the same way as explained before, with the ability to adjust the downward force on the wheels 54 against the soil. Another advantage of the press wheels 54 of the alternate embodiment, it that a seed piece 40 can be dropped between the wheels 54 and still benefit from the tucking effect of the wheels 54 to prevent set roll. It will be appreciated that the effective span in which a seed piece 40 can be dropped relative to the pair of press wheels 54, extends forward and back where the seed piece or a portion thereof intersects the forward shadow of the press wheel, whether it is the forward boundary of the shadow 50' as shown by position 40' or the rearward boundary of that shadow 50', as shown by position 40" in FIG. 9.

Because a press wheel has an inherent amount of slip against the soil, it is also contemplated to provide a drive system to rotate the press wheels 54 or the previously mentioned wider wheel 24 to match ground speed and to reduce the friction of the wheels against the soil.

As to other details and manner of operation of the preferred equipment, for planting seed pieces at high speed according to the present invention, the same should be apparent from the above description and drawings, and accordingly further discussion related to these aspects is deemed unnecessary.

What is claimed is:

1. A method for planting potatoes at high speed using a potato planter having in series, a furrow-opening shoe; a seed release mechanism, a press wheel having a soft and flexible central surface and a pair of closing discs; comprising the steps of:
   opening a furrow in a soil;
   dropping potato seed pieces from said seed release mechanism at spaced intervals in said furrow such that each of said seed pieces or a portion thereof intersects a forward shadow of said press wheel, and
   rolling said soft and flexible central surface of said press wheel over said seed piece while retaining said press wheel on sides of said furrow, for causing said seed piece to decelerate into said soil, and
   closing said furrow using said closing discs.

2. The method as claimed in claim 1, wherein said step of rolling comprises tucking said seed piece in said furrow.

3. The method as claimed in claim 1, wherein said step of opening a furrow includes the step of opening a furrow having a width of 3 inches or less.

4. The method as claimed in claim 3, wherein said step of opening a furrow also includes the step of opening a furrow at a distance of 24 inches or less ahead of said press wheel.

5. The method as claimed in claim 2, wherein said step of tucking comprises pushing soil from said sides of said furrow against said seed piece.

6. Equipment for planting potatoes at high speed, comprising:
   a potato planter having in series a furrow-opening shoe, a seed release mechanism and a pair of closing discs, and further including:
   a press wheel mounted between said seed release mechanism and said closing , discs;
   said seed release mechanism having a deflector therein for deflecting seed pieces into a forward shadow of said press wheel; and
   said furrow-opening shoe having a one-inch diameter soil-cutting bar there-under.

7. The equipment as claimed in claim 6, wherein said press wheel has a soft central region and harder side regions.

8. The equipment as claimed in claim 6, wherein said furrow-opening shoe has a length of about 12 inches and extends substantially 24 inches ahead of said press wheel.

9. The equipment as claimed in claim 6, wherein said press wheel has a diameter of about 10 inches.

10. The equipment as claimed in claim 8, wherein said furrow-opening shoe has a width of about 3 inches or less.

11. The equipment as claimed in claim 6, wherein said press wheel is part of a pair of press wheels, and said pair of press wheels are mounted in a spaced-apart, positive-camber-like alignment.

12. The equipment as claimed in claim 11, wherein said positive-camber-like alignment is set at mirror angles of 25° to 35° from a vertical line.

13. The equipment as claimed in claim 11, wherein said press wheels are driven.

14. A method for reducing set roll of potato seed pieces when planting potato seed pieces, comprising:
   a) using a furrow opening shoe, opening a furrow in a soil surface, said furrow having a longitudinal axis, a bottom surface extending along said longitudinal axis, a width dimension and a depth dimension extending below said soil surface;
   b) releasing potato seed pieces from a seed release mechanism, downward at timed intervals along a vertical seed piece release axis;
   c) rolling a press wheel over said furrow behind said seed release axis;
   d) guiding each of said potato seed pieces along a two-vector trajectory, comprising guiding each of said potato seed pieces along a first vector coinciding with said seed piece release axis; using a deflector positioned along said seed release axis, deflecting each of said potato seed pieces backward and downward away from said seed piece release axis along a second vector coinciding with a reflection of said seed release axis against said deflector, and projecting each of said potato seed pieces toward said longitudinal axis beneath a forward half of said press wheel; and
   e) said step of rolling comprises checking a set roll of each of said potato seed pieces.

* * * * *